(12) United States Patent
Itakura

(10) Patent No.: US 10,989,128 B2
(45) Date of Patent: Apr. 27, 2021

(54) INTAKE AIR FLOW RATE MEASURING DEVICE

(71) Applicant: DENSO CORPORATION, Kariya (JP)

(72) Inventor: Keisuke Itakura, Kariya (JP)

(73) Assignee: DENSO CORPORATION, Kariya (JP)

( * ) Notice: Subject to any disclaimer, the term of this patent is extended or adjusted under 35 U.S.C. 154(b) by 139 days.

(21) Appl. No.: 16/447,066

(22) Filed: Jun. 20, 2019

(65) Prior Publication Data

US 2019/0301388 A1   Oct. 3, 2019

Related U.S. Application Data

(62) Division of application No. 15/647,298, filed on Jul. 12, 2017, now Pat. No. 10,371,076.

(30) Foreign Application Priority Data

Jul. 20, 2016   (JP) .................... 2016-142314

(51) Int. Cl.
*F02D 41/18* (2006.01)
*G01F 1/684* (2006.01)
*G01F 5/00* (2006.01)
*G01F 15/12* (2006.01)
*F02D 41/28* (2006.01)

(52) U.S. Cl.
CPC .......... *F02D 41/18* (2013.01); *G01F 1/6842* (2013.01); *G01F 5/00* (2013.01); *G01F 15/12* (2013.01); *F02D 2041/281* (2013.01); *F02D 2041/286* (2013.01); *F02D 2200/0414* (2013.01); *F02D 2200/0418* (2013.01); *F02D 2400/18* (2013.01); *F02D 2400/22* (2013.01)

(58) Field of Classification Search
CPC ............ F02D 41/18; F02D 2200/0414; F02D 2200/0418; F02D 2041/286; G01F 5/00; G01F 1/6842; G01F 15/12
See application file for complete search history.

(56) References Cited

U.S. PATENT DOCUMENTS 7,640,798 B2 * 1/2010 Oda ................... G01F 1/692
                                                            73/204.26
8,701,475 B2 * 4/2014 Kohno ................ G01F 1/6842
                                                            73/114.33
(Continued)

FOREIGN PATENT DOCUMENTS

JP   H10-197305 A    7/1998
JP   2010-145155 A   7/2010
(Continued)

*Primary Examiner* — Freddie Kirkland, III

(57) ABSTRACT

The present disclosure provides an intake air flow rate measuring device. The intake air flow rate measuring device includes a flange, a casing, a flow rate sensor, a humidity sensing element, an element terminal, and a humidity terminal. The humidity terminal is spaced away from the element terminal. A portion of the casing between the element terminal and the humidity terminal is defined as a suppressing portion, and a cross-section of the suppressing portion is defined as a suppressing portion cross-section. An end portion of the casing close to the flange is defined as a base portion, and a cross-section of the base portion is defined as a base portion cross-section. The suppressing portion cross-section is set to be smaller than the base portion cross-section.

11 Claims, 13 Drawing Sheets

(56) References Cited

U.S. PATENT DOCUMENTS

| | | | |
|---|---|---|---|
| 9,163,964 B2* | 10/2015 | Schneider | G01F 1/00 |
| 9,851,234 B2* | 12/2017 | Isoya | G01F 1/684 |
| 9,958,305 B2* | 5/2018 | Nakano | G01F 1/6842 |
| 9,976,976 B2* | 5/2018 | Nakano | G01F 1/684 |
| 10,030,601 B2* | 7/2018 | Kaifu | F02D 41/18 |
| 2011/0088464 A1 | 4/2011 | Ariyoshi et al. | |
| 2012/0198925 A1 | 8/2012 | Saito et al. | |
| 2013/0036806 A1 | 2/2013 | Kohno | |
| 2015/0000395 A1 | 1/2015 | Tashiro et al. | |
| 2016/0139071 A1* | 5/2016 | Nakano | G01F 1/684 73/23.31 |
| 2016/0146651 A1 | 5/2016 | Isoya et al. | |
| 2016/0202200 A1* | 7/2016 | Nakano | G01F 1/6845 73/23.31 |
| 2016/0273949 A1 | 9/2016 | Kawai et al. | |
| 2017/0342928 A1* | 11/2017 | Ooga | G01F 1/6847 |
| 2018/0023983 A1* | 1/2018 | Watanabe | F02M 35/1038 73/431 |
| 2018/0252564 A1 | 9/2018 | Tashiro et al. | |
| 2020/0150065 A1* | 5/2020 | Miki | G01F 5/00 |

FOREIGN PATENT DOCUMENTS

| | | |
|---|---|---|
| JP | 2010-151795 A | 7/2010 |
| JP | 2015-090338 A | 5/2015 |

* cited by examiner

COMPARATIVE EXAMPLE

INTAKE AIR FLOW RATE MEASURING DEVICE

CROSS REFERENCE TO RELATED APPLICATION

This application is a divisional application of U.S. patent application Ser. No. 15/647,298 filed on Jul. 12, 2017, which is based on Japanese Patent Application No. 2016-142314 filed on Jul. 20, 2016. The contents of these applications are incorporated herein by reference in their entirety.

TECHNICAL FIELD

The present disclosure relates to an intake air flow rate measuring device installed in an engine compartment.

BACKGROUND

In order to improve fuel economy or purifying level of exhaust gas, there has been a demand in recent years for measuring a humidity of an intake air that is to be drawn into an engine. Thus, such an intake air flow rate measuring device is equipped with a humidity sensing element to measure a humidity of an intake air as well as a flow rate (refer to, for example, JP 2010-151795 A).

JP 2010-151795 A discloses an intake air flow rate measuring device that is inserted into an intake air duct and is equipped with a humidity sensing element.

Typically, a humidity ratio has been used for controlling an engine. The humidity sensing element for detecting such a humidity ratio includes, in addition to a humidity detector to detect a relative humidity, a temperature detector to detect a temperature of the humidity sensing element itself. Then, the humidity sensing element calculates a humidity ratio based on the relative humidity detected and the temperature of the humidity sensing element.

However, as shown in FIG. 19 illustrating curves of a relative humidity with respect to a temperature, the slope of each of the relative humidity curves increases as the temperature increases. Therefore, a detection error may increase as the temperature increases.

In the intake air flow rate measuring device disclosed in JP 2010-151795 A, heat in an engine compartment transfers to the humidity sensing element in the intake air duct through, e.g., a flange of the intake air flow rate device. As a result, the temperature of the humidity sensing element may be increased by the heat.

If the humidity sensing element is heated, the detection error may increase as described above, and therefore accuracy of detecting a humidity may be deteriorated.

With reference to FIG. 19, one example situation where detection accuracy is deteriorated due to an increase of the temperature of the humidity sensing element will be described. In this example, detection accuracy of a relative humidity is set to be within ±3% RH, and a humidity ratio of an intake air is 18.8 g/kg. When the temperature of the intake air is 30° C., the detection error range of the humidity sensing element is 18.3-19.7 g/kg. However, when the temperature of the humidity sensing element increases to 50° C. due to, e.g., heat in the engine compartment, the detection error range of the humidity sensing element is substantially deteriorated to 16.4-21.3 g/Kg.

In view of the above, it is an objective of the present disclosure to provide an intake air flow rate measuring device that is configure to avoid deteriorating a detection error of a humidity due to an increase in a temperature of a humidity sensing element due to heat in an engine compartment.

SUMMARY

An aspect of the present disclosure provides an intake air flow rate measuring device that is inserted into an attachment hole of an intake air duct introducing an intake air into an engine. The intake air flow rate measuring device measures a flow rate of the intake air flowing through the intake air duct. The intake air flow rate measuring device includes a flange, a casing, a flow rate sensor, a humidity sensing element, an element terminal, and a humidity terminal.

The flange is disposed outside of the intake air duct to cover the attachment hole. The casing extends in both the attachment hole and the intake air duct. The flow rate sensor is disposed in the casing to measure a flow rate of the intake air flowing through the intake air duct. The humidity sensing element is disposed in the casing to measure a humidity of the intake air flowing through the intake air duct. The element terminal is positioned only inside the intake air duct and is electrically connected to the humidity sensing element. The humidity terminal passes through the flange.

The humidity terminal is positioned spaced away from the element terminal. The electric connector is disposed between the humidity terminal and the element terminal to electrically connect the humidity terminal to the element terminal. Heat is less likely to transfer the electric connector as compared to the humidity terminal and the element terminal. The portion of the casing between the element terminal and the humidity terminal is defined as a suppressing portion, and a cross-section of the suppressing portion is defined as a suppressing portion cross-section. And an end portion of the casing close to the flange is defined as a base portion, and a cross-section of the base portion is defined as a base portion cross-section. The suppressing portion cross-section is set to be smaller than the base portion cross-section.

The suppressing portion cross-section is set to be smaller than the root portion cross-section. Thus, since heat outside of the intake air duct is restricted at the suppressing portion, heat is suppressed to transfer to the humidity sensing element. As a result, it is possible to avoid a situation where a temperature of the humidity sensing element is increased by heat in the engine compartment, thereby decreasing a detection error of the humidity.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
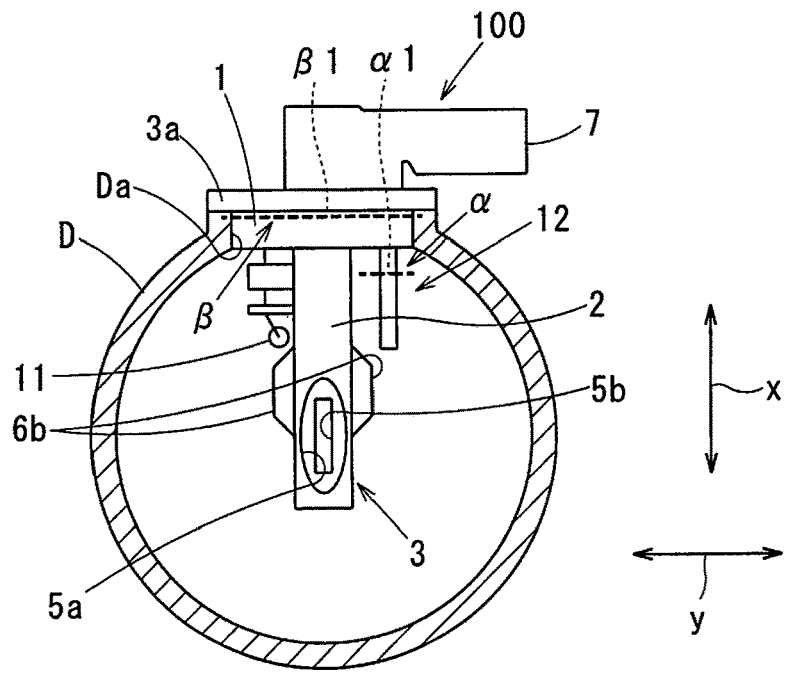
FIG. 1 is a front view of an intake air flow rate measuring device viewed from an upstream side of an airflow direction of an intake air.

It is needless to say that following embodiments are some examples of the present disclosure, and therefore the present disclosure is not limited to these embodiment. Furthermore, each of the substantially same structures among the embodiments will be assigned to the respective common referential numeral and the description of the substantially same structures will be omitted in the subsequent embodiments.

First Embodiment

Referring FIGS. 1 to 7, a first embodiment of the present disclosure will be described below.

An intake air flow rate measuring device 100 is disposed in an intake air duct D introducing an intake air to an engine for a vehicle. That is, the intake air flow rate measuring device 100 is disposed in an engine compartment.

The intake air duct D is an outlet of an air cleaner or intake pipe. The intake air duct D defines an attachment hole Da for the intake air flow rate measuring device 100. The attachment hole Da has a cylindrical shape passing through the intake air duct D.

The intake air flow rate measuring device 100 is inserted into the attachment hole Da and measures a flow rate of the intake air flowing through the intake air duct D.

The intake air flow rate measuring device 100 includes a flange 3a, which is disposed in an outer side of the intake air duct D and covers the attachment hole Da, and a casing 3, which is disposed in the intake air duct D.

The casing 3 houses a flow rate sensor 4 and a humidity sensing element 13. The flow rate sensor 4 measures a flow rate of the intake air flowing through the intake air duct D. The humidity sensing element 13 measures a humidity of the intake air flowing through the intake air duct D.

The casing 3 according to the first embodiment includes a base 1 disposed inside the attachment hole Da, a main body 2 having the flow rate sensor 4, and a humidity sensor 12 having the humidity sensing element 13.

The main body 2 and the humidity sensor 12 are separately supported by the flange 3a.

The humidity sensor 12 includes a circuit substrate 15 on which the humidity sensing element 13 is disposed and a molding resin 17 covering the humidity sensing element 13 and the circuit substrate 15.

The intake air flow rate measuring device 100 includes an element terminal and humidity terminals 18. The element terminal is positioned only inside the intake air duct D and is electrically connected to the humidity sensing element 13. The humidity terminals 18 pass through the flange 3a. Each of the humidity terminals 18 electrically connects the ouster side of the flange 3a to the element terminal inside the intake air duct D.

In the first embodiment, the above-described circuit substrate 15 serves as the element terminal.

The base 1 is adjacent to the flange 3a and is formed of the same resin material as the flange 3a. The attachment hole Da is filled with the base 1, and a packing such as an O-ring is attached to an outer circumferential surface of the base 1. As a result, when the intake air flow rate measuring device 100 is attached to the intake air duct D, a space between the attachment hole Da and the base 1 is sealed with the packing.

Figure 6A:
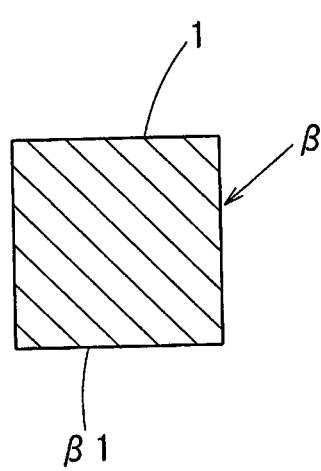
FIG. 6A is a diagram describing a root portion cross-section.
Figure 6B:
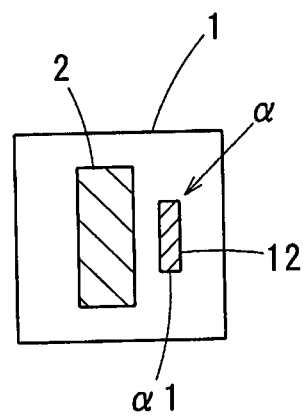
FIG. 6B is a diagram describing a suppressing portion cross-section.

It should be noted that although FIGS. 6A and 6B show the cross-section of the base 1 with a rectangular shape, the base 1 may have a cross-section with any other shape such as a circle.

The main body 2 defines therein a passage through which a portion of an intake air flows. The main body 2 is formed of the same resin material as the flange 3a. One example of the structure of the passage formed in the main body 2 will be described below, although the passage may have a different structure.

A bypass passage 5 and a sub-bypass passage 6 are defined in the main body 2. A portion of the intake air flowing through the intake air duct D flows through the bypass and sub-bypass passages 5, 6.

The bypass passage 5 is a passage allowing a portion of the intake air flowing through the intake air duct D to pass through the bypass passage 5. The bypass passage 5 extends along a flow direction of the intake air in the intake air duct D. An intake air inlet 5a of the bypass passage 5 is formed upstream of the intake air duct D, whereas an intake air outlet 5b of the bypass passage 5 is formed downstream of the intake air duct D. A squeezed opening is formed at the intake air outlet 5b to restrict an amount of the intake air passing through the bypass passage 5.

The sub-bypass passage 6 includes a sub inlet 6a and a sub outlet 6b. A portion of the intake air flowing through the bypass passage 5 flows into the sub inlet 6a. The intake air passing through the sub-bypass passage 6 returns to the intake air duct D through the sub outlet 6b. More specifically, the sub-bypass passage 6 causes the intake air flowing in through the sub inlet 6a to go around in the main body 2 and then to return into the intake air duct D. Although FIGS. 1 and 2 show the sub outlet 6b of the sub-bypass passage 6 formed outside the bypass passage 5, the sub outlet 6b may serve to cause the intake air passing through the sub-bypass passage 6 to return to the bypass passage 5 again.

A connector 7 is disposed in an outside portion of the intake air flow rate measuring device 100 that is positioned outside of the intake air duct D. The connector 7 is electrically connected to an external equipment such as an engine control unit. The connector 7 is formed of the same resin material as the flange 3a.

The flow rate sensor 4 is a thermal type sensor to measure a flow rate of the intake air flowing through the sub-bypass passage 6 based on a thermal detection value. A chip type with a thinner substrate or a bobbin type resistance may be used for the flow rate sensor 4.

Figure 2:
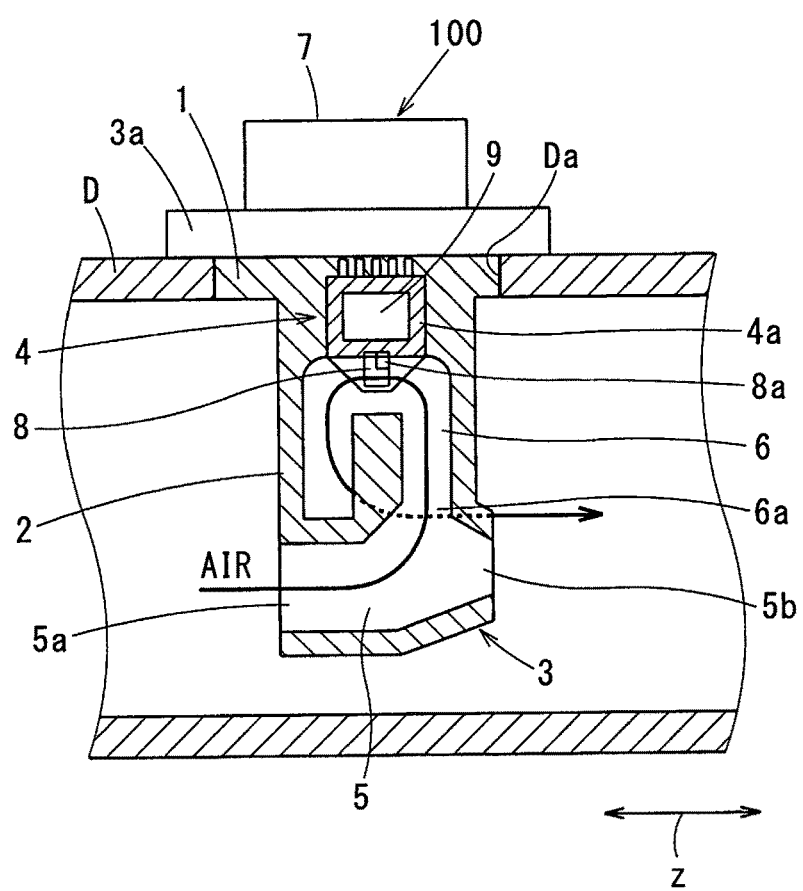
FIG. 2 is a cross-sectional view of the intake air flow rate measuring device taken along the airflow direction of the intake air.

FIG. 2 shows one example of the flow rate sensor 4 that is a chip type arranged inside the main body 2 in an assembled state.

The flow rate sensor 4 includes a sensor substrate 8 including a flow rate detector 8a that detects a flow rate of the intake air. The flow rate sensor 4 also includes a flow rate sensor circuit 9 electrically connected to the connector 7. The flow rate sensor 4 includes a circuit body 4a housing the flow rate sensor circuit 9.

It should be noted that the flow rate sensor circuit 9 is configured to compensate a flow rate detected by the flow rate detector 8a using the temperature of the intake air, and to output a flow rate signal being converted into digital form after the compensation.

The main body 2 is formed of the same resin material as the flange 3a. A plurality of flow rate terminals 10, which are electrically connected to the flow rate sensor 9, are disposed inside the main body 2 in addition to the circuit body 4a (see FIG. 5). An end of each of the flow rate terminals 10 enters into the connector 7. Specifically, the connector 7 shown in FIG. 1 is a so-called male connector and a female type resin coupler, which is made of the same resin material as the flange 3a, is disposed in the connector 7. Then, the end of each of the flow rate terminals 10 is arranged inside the resin coupler.

The intake air flow rate measuring device 100 includes an intake air temperature sensor 11 to measure a temperature of the intake air flowing through the intake air duct D.

The intake air temperature sensor 11 is disposed outside of the main body 2 as shown in FIG. 2 and measures a temperature of the intake air flowing through an area outside of the main body 2. More specifically, the intake air temperature sensor 11 is disposed in a position spaced away from the main body 2 so as not to be affected by heat from the main body 2.

The intake air temperature sensor 11 shown in FIG. 1 is a thermistor using a bobbin type resistance. The intake air temperature sensor 11 includes a thermistor body having variable resistance depending on a temperature and two leads extending from the thermistor body. The two leads are supported by a protrusion, and therefore the thermistor body is supported at the area spaced away from the main body 2 by a certain distance.

The temperature signal of the intake air measured by the intake air temperature sensor 11 may be obtained as a voltage of the resistance variation or output after being converted to digital.

The intake air flow rate measuring device 100 includes the humidity sensor 12 that measures a humidity of the intake air flowing through the intake air duct D. The specific description of the humidity sensor 12 will be described with reference to FIGS. 3 to 7. In the following description, an up-and-down direction of the intake air duct D in FIG. 1 is defined as an x-axis direction and a right-and-left direction of the intake air duct D in FIG. 2 is defined as a y-axis direction. Furthermore, a direction along which a center axis of the cylindrical shape of the intake air duct D extends, in other words, a flow direction of the intake air flowing through an area outside of the main body 2, is defined as a z-axis direction.

The humidity sensor 12 has a plate shape. Hereinafter, a direction along which the longest side of the humidity sensor 12 extends, i.e., an up-and-down direction of FIG. 3B, is defined as an x1 direction. A direction along which the shortest side of the humidity sensor 12 extends, i.e., a right-and-left direction in FIG. 3B, is defined as a y1 direction. Further, a direction along which the second longest side of the humidity sensor 12 extends, i.e., a right-and-left direction in FIG. 3C is defined as a z1 direction.

The humidity sensor 12 of the first embodiment is supported by the flange 3a and the base 1 with being separate with the main body 2, as shown in FIG. 1, and measures a humidity of the intake air flowing through an area outside of the main body 2.

The humidity sensor 12 is disposed at a position spaced away from the main body 2 so as not to be affected by heat from the main body 2 while allowing the intake air passing through the intake air duct D to collide with the humidity sensor 12 (i.e., the humidity sensor 12 is directly exposed to the intake air).

The humidity sensor 12 is arranged so that the x1 direction of the humidity sensor 12 is parallel with the x-direction of the intake air duct D, the y1 direction of the humidity sensor 12 is parallel with the y-direction of the intake air duct D, and the z1 direction of the humidity sensor 12 is parallel with the z-direction of the intake air duct D.

That is, the elongated surface of the humidity sensor 12 extending along the z1 direction is arranged to be parallel with the flow direction of the intake air.

The structure of the humidity sensor 12 will be described in detail below.

The humidity sensor 12 includes the humidity sensing element 13 that measures a humidity of the intake air.

The humidity sensor 12 includes a humidity sensor circuit 14 that outputs a humidity signal of the humidity sensing element 13.

The humidity sensing element 13 and the humidity sensor circuit 14 are mounted on the circuit substrate 15.

The humidity sensor 12 includes a heat radiating plate 16 made of a metal.

The heat radiating plate 16 serves to make the temperatures of the humidity sensing element 13 and the humidity sensor circuit 14 close to the temperature of the intake air.

The humidity sensor 12 includes the molding resin 17 that covers the humidity sensing element 13 on the circuit substrate 15 and the humidity sensor circuit 14.

The humidity sensing element 13 is configured to obtain a humidity ratio. For example, a commercially available IC for sensing a humidity may be used as the humidity sensing element 13. More specifically, the humidity sensing element 13 includes a humidity detector 13a that detects a relative humidity and a temperature detector that detects a temperature of the humidity sensing element 13. Then, the humidity sensing element 13 calculates the humidity ratio from the relative humidity detected by the humidity detector 13a and the temperature detected by the temperature detector, and outputs the humidity ratio as a humidity signal.

The humidity detector 13a is a device utilizing a capacitance change. In the humidity detector 13a, capacitance varies in accordance with a relative humidity of the intake air in contact with the humidity detector 13a. For example, the humidity detector 13a is formed of a humidity-sensitive material 13b such as polyimide and two electrodes 13c. More specifically, as shown in FIG. 3B, two electrodes 13c are arranged on a silicon substrate 13d serving as a base, and then the two electrodes 13c are disposed inside the humidity-sensitive material 13b.

The humidity-sensitive material 13b is directly exposed to the intake air. An amount of water molecules contained in the humidity-sensitive material 13b varies in accordance with a humidity of the intake air in contact with the humidity-sensitive material 13b. When the amount of the water molecules contained in the humidity-sensitive material 13b varies, capacitance between the two electrodes 13c also varies. The method to detect the capacitance is similar to a method to detect capacitance for a small capacitor. For example, the method to detect capacitance with an LCR that utilizes a change of an oscillation frequency according to the change in capacitance may be used.

Although the humidity detector 13a is a device utilizing the capacitance change as described above in the present embodiment, other types of devices such as a device utilizing a resistance change may be used as the humidity detector 13a.

The humidity sensor circuit 14 is a circuit outputting the humidity signal generated by the humidity sensing element 13. The humidity sensor circuit 14 may be formed of a variety of electric components such as an operational amplifier. The humidity signal from the humidity sensor 12 may be an analog signal of a voltage change, or a digital signal.

The circuit substrate 15 is a resin film having a print circuit formed on only a surface on which the humidity sensing element 13 and the humidity sensor circuit 14 are disposed. The print circuit is electrically connected to electric components such as the humidity sensing element 13 and the humidity sensor circuit 14.

The circuit substrate 15 has an elongated shape extending along the x1 direction. The humidity sensing element 13 is disposed on the circuit substrate 15 at a position close to the center of the intake air duct D. The humidity sensor circuit 14 is disposed on the circuit substrate 15 at a position closer to the flange 3a than the humidity sensing element 13 is to the flange 3a.

The heat radiating plate 16 is a radiator made of a metal having high thermal conductivity. The heat radiator 16 is thermally coupled with the humidity sensing element 13 and the humidity sensor circuit 14. The heat radiating plate 16 is exposed to the intake air flowing through the intake air duct D and serves to make the temperatures of the humidity sensing element 13 and the humidity sensor circuit 14 close to the temperature of the intake air. The heat radiating plate 16 also serves as a supporting plate that supports the circuit substrate 15.

The molding resin 17 is an insulating resin formed through injection molding. More specifically, the molding resin 17 is formed by injecting a molding material to the components forming the humidity sensor 12 that has been inserted. The molding resin 17 protects the components forming the humidity sensor 12 and increases rigidity of the humidity sensor 12.

A window portion 17a is formed by being recessed from the molding resin 17. The window portion 17a guides the intake air directly to the humidity sensing element 13. In the present embodiment, the window portion 17a is arranged to face the main body 2, whereas the heat radiating plate 16 is arranged in an opposite direction from the main body 2. However, it may not necessarily limit to this arrangement, and the opposite arrangement may be used, alternatively.

One end of the molding resin 17 in the elongated direction is inserted into the flange 3a and the base 1. Thus, the humidity sensor 12 is supported by both the flange 3a and the base 1.

The molding resin 17 may have any shape of a cross-section. For example, the molding resin 17 may have a shape having a round shape at a corner thereof to reduce a resistance against the flow of the intake air. Alternatively, the molding resin 17 may have an upstream end and a downstream end both of which has a streamlined shape or a tapered shape so as to reduce the intake air flow resistance.

The humidity sensor 12 includes a plurality of humidity terminals 18. Each of the humidity terminals 18 has a portion inside the molding resin 17. Each of the humidity terminals 18 is electrically connected to the circuit substrate 15, and is an elongated metal plate formed by pressing a metal film having conductivity.

The humidity terminals 18 and the circuit substrate 15 are spaced away from each other along the x1 direction. In other words, a physical space between an end of each of the humidity terminals 18 closest to the circuit substrate 15 and an end of the heat radiating plate 16 closest to the humidity terminal 18 exists.

Electric connectors 19 are disposed between the humidity terminals 18 and the circuit substrate 15. The electric connectors 19 electrically connect the humidity terminals 18 to the circuit substrate 15. In the first embodiment, the electric connector 19 is a conductive wiring such as wire bonding. It should be noted that the wire bonding is a technology for electrically connecting a metal wiring such as a gold, a copper, or an aluminum by thermo-compressing bonding or ultra-sonic thermo-compressing bonding.

Heat is less likely to transfer through each of the electric connectors 19 as compared to the humidity terminals 18 and the circuit substrate 15. More specifically, the electric connector 19 is a wiring for the wire bonding, and therefore the electric connector 19 has a substantially small cross-section. Thus, the thermal conductivity of the electric connectors 19 is less than that of the humidity terminals 18 and the circuit substrate 15.

Figure 3A:
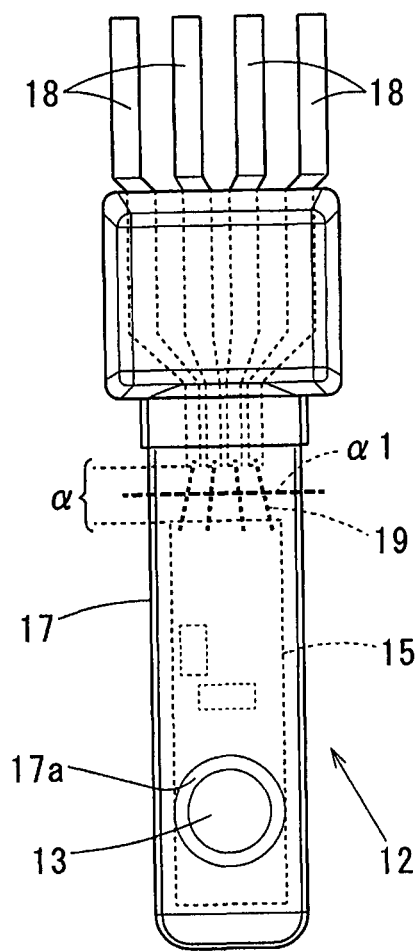
FIG. 3A is a plan view of a humidity sensor.
Figure 3B:
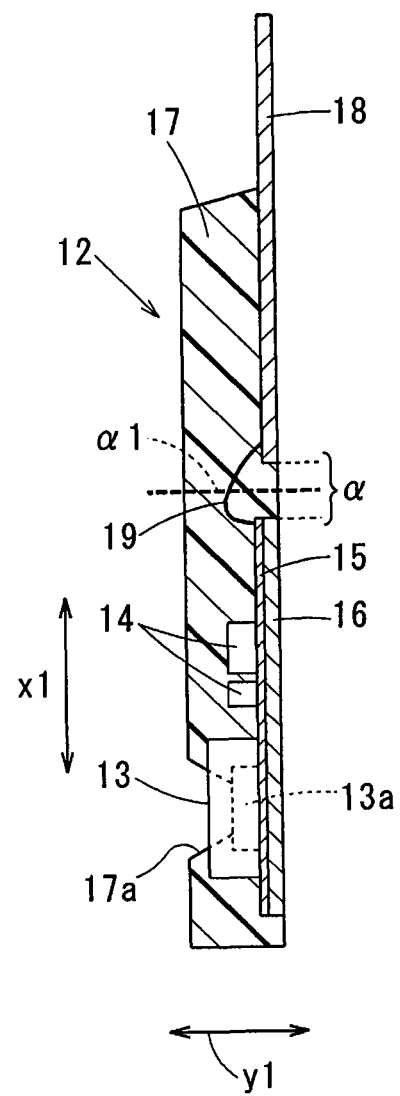
FIG. 3B is a cross-sectional view of the humidity sensor taken along an elongated direction of the humidity sensor.
Figure 3C:
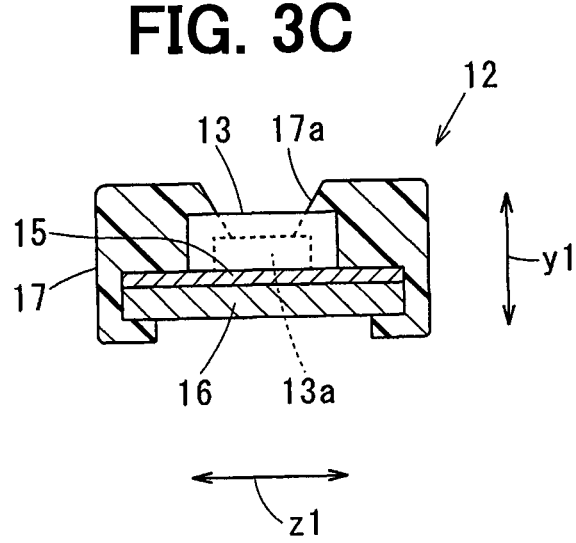
FIG. 3C is a cross-sectional view of the humidity sensor taken along a direction perpendicular to the elongated direction.
Figure 4:
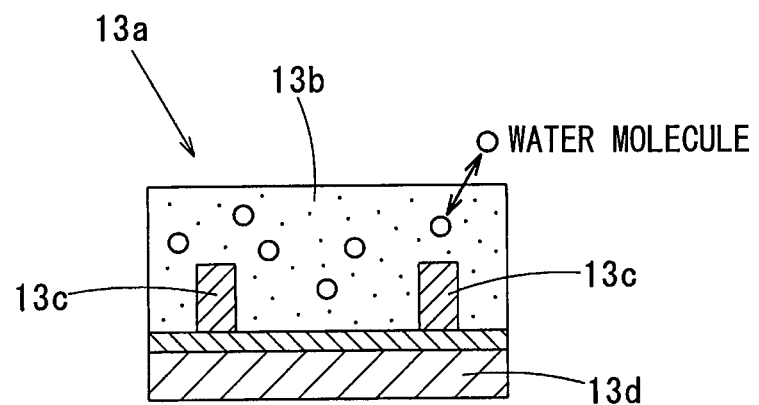
FIG. 4 is a cross-sectional view of a humidity sensing element.

As shown in FIGS. 3A and 3B, a portion of each of the humidity terminals 18 is exposed to an outside of the molding resin 17 in a state where the humidity sensor 12 is not disposed inside the base 1 and the flange 3a.

Figure 5:
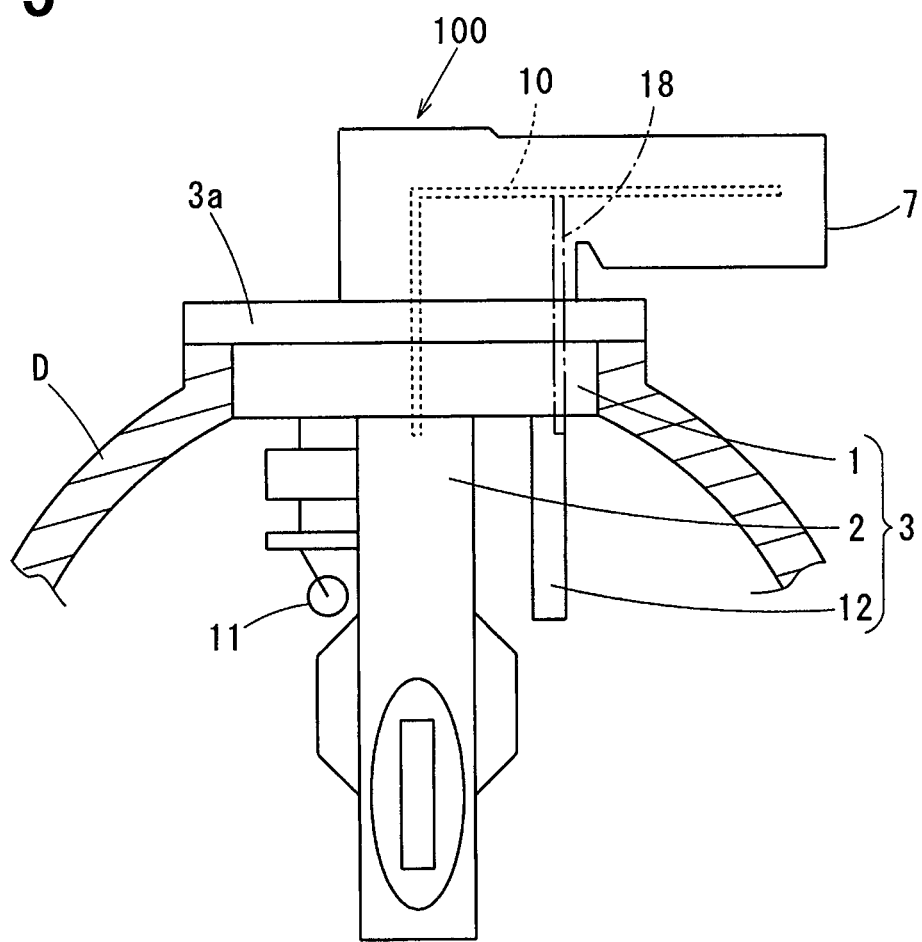
FIG. 5 is a diagram of a humidity terminal and a flow rate terminal.

The portions of the humidity terminals 18 outside of the molding resin 17 are disposed inside the base 1 and the flange 3a through insert molding. In the first embodiment, an end of each of the humidity terminals 18 is electrically connected to the middle of the flow rate terminal 10, as shown in FIG. 5. Alternatively, the end of each of the humidity terminals 18 may be disposed inside the connector 7 by setting the humidity terminals 18 independently.

A portion of the casing 3 between the circuit substrate 15 and the humidity terminals 18 is defined as a suppressing portion α. That is, a portion of the molding resin 17 is the suppressing portion α among the casing 3.

The cross-section of the suppressing portion α is defined as a suppressing portion cross-section α1. In other words, the cross-section of the molding resin 17 among the suppressing portion α is the suppressing portion cross-section α1. The suppressing portion cross-section α1 is a cross-section formed by cutting the suppressing portion α along a direction perpendicular to the z1 direction. The portion of the narrowed cross-section α1 is indicated by the broken line in FIG. 1. Further, FIG. 6B shows the cross-sections of the main body 2 and the humidity sensor 12 formed by cutting the suppressing portion α in a direction perpendicular to the x1 direction.

The end of the casing 3 close to the flange 3a is defined as a base portion 3. The base portion β is the end of the base 1 close to the flange 3a.

The cross-section of the base portion β is defined as a base portion cross-section β1. That is, the cross-section of the base 1 formed of a resin is defined as the base portion cross-section β1. The base portion cross-section β1 is a cross-section cutting the base β in a direction perpendicular to the x-axis direction, and the portion of the base portion cross-section β1 is indicated by the broken line in FIG. 1. Further, FIG. 6A shows a cross-section formed by cutting the base β in a direction perpendicular to the x-axis direction.

Figure 20:
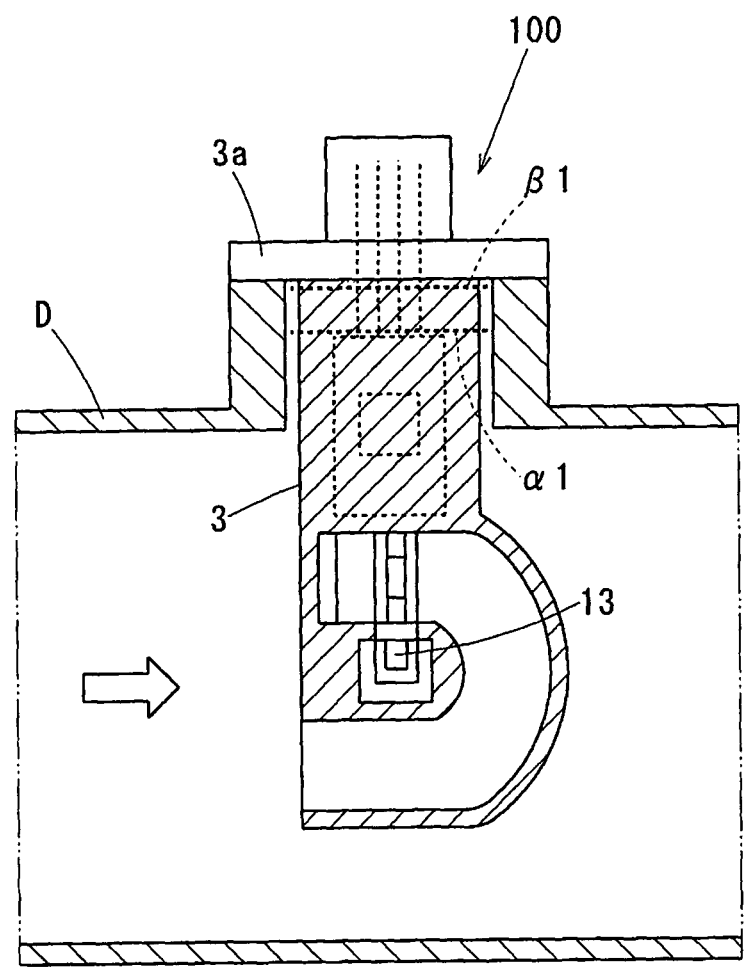
FIG. 20 is a schematic view of a comparative example of an intake air flow rate measuring device.

For a comparative reason, FIG. 20 shows a comparative example of an intake air flow rate measuring device 100 in which the corresponding positions of the suppressing portion cross-section α1 and the base portion cross-section β1 are indicated. As shown in FIG. 20, the suppressing portion cross-section α1 and the base portion cross-section β1 are the same.

In the intake air flow rate device 100 according to the present embodiment, the suppressing portion cross-section α1 is formed to be smaller than the base portion cross-section β1.

By making the suppressing portion cross-section α1 smaller than the base portion cross-section β1, the thermal resistance of the suppressing portion α can be increased. As a result, even when heat outside of the intake air duct D is transferred to the humidity sensor 12 through the flange 3a, transfer of the heat to the humidity sensing element 13 is restricted by the suppressing portion α. Hereinafter, this effect by the suppressing portion α is referred to as a "first effect".

Further, by making the suppressing portion cross-section α1 smaller than the base portion cross-section β1, heat capacity of the suppressing portion α can be reduced. Thus, the suppressing portion α can be easily cooled. As a result, the temperature of the suppressing portion α can be easily decreased by the intake air flowing through the intake air duct D. Hereinafter, this effect of the suppressing portion α is referred to as a "second effect".

According to the first and second effects, heat transfer through the suppressing portion α can be suppressed. Thus, even when heat outside of the intake air duct D is transferred to the humidity sensor 12 through the flange 3a, heat transfer to the humidity sensing element 13 can be restricted by the suppressing portion α.

Accordingly, an increase in the temperature of the humidity sensing element 13 due to, e.g., heat in the engine compartment can be avoided. Thus, the temperature of the humidity sensing element 13 can be substantially the same as the temperature of the intake air flowing through the intake air duct D. As a result, a detection error of the humidity due to the heat in the engine compartment can be suppressed. In other words, the humidity (more specifically, the humidity ratio) of the intake air flowing into the engine can be accurately detected by the humidity sensor 12 disposed in the intake air flow rate measuring device 100.

In the first embodiment, the main body 2 and the humidity sensor 12 are separately (independently) supported by the flange 3a and the base 1. Heat transfer from an outside of the intake air duct D is divided into the main body 2 and the humidity sensor 12. Thus, a heat amount transferred to the humidity sensor 12 can be reduced. The heat transferred to the humidity sensor 12 is further released by the intake air flowing through the intake air duct D.

In this way, the first embodiment has a structure that suppresses heat outside of the intake air duct D to transfer to the humidity sensor 12. In addition, the suppressing portion cross-section α1 is smaller than the base portion cross-section β1. Thus, heat transfer to the humidity sensor 13 over the suppressing portion cross-section α1 and the electric connectors 19 can be further reduced.

The thermal resistance of the electric connectors 19 is greater than that of the humidity terminals 18.

Therefore, the heat transfer suppressing effect by the electric connectors 19 can be enhanced, and thus heat transfer to the humidity sensor 13 through the electric connectors 19 can be suppressed. As a result, it is possible to avoid a situation where the humidity sensor 13 is heated by heat transferred from the outside through the humidity terminals 18.

Each of the electric connectors 19 according to the first embodiment is a metal wiring, such as a gold, a copper, or an aluminum, subject to wire bonding.

By using such an electric connector, the cross-section of thereof for electric connection can be small. Thus, thermal resistance of the electric connectors 19 can be increased, and therefore the heat transfer suppressing effect by the electric connectors 19 can be increased. Further, by using the wire bonding technology, productivity during electric connection between the humidity terminals 18 and the circuit substrate 15 can be increased.

That is, by using the wirings subject to the wire bonding as the electric connectors 19, the heat transfer suppressing effect by the electric connectors 19 and the productivity of the electric connection process can be improved at the same time.

The thermal conductivity of each of the humidity terminals 18 is less than the flow rate terminal 10. For example, the flow rate terminals 10 are formed of a copper. In contrast, the humidity terminals 18 are formed of phosphor bronze having thermal conductivity less than the copper.

In this way, by forming the humidity terminals 18 with metallic material having low thermal conductivity, an amount of heat transferred to the electric connectors 19 through the humidity terminals 18 can be reduced, and as a result heat reaching the humidity sensing element 13 can be reduced.

Figure 7:
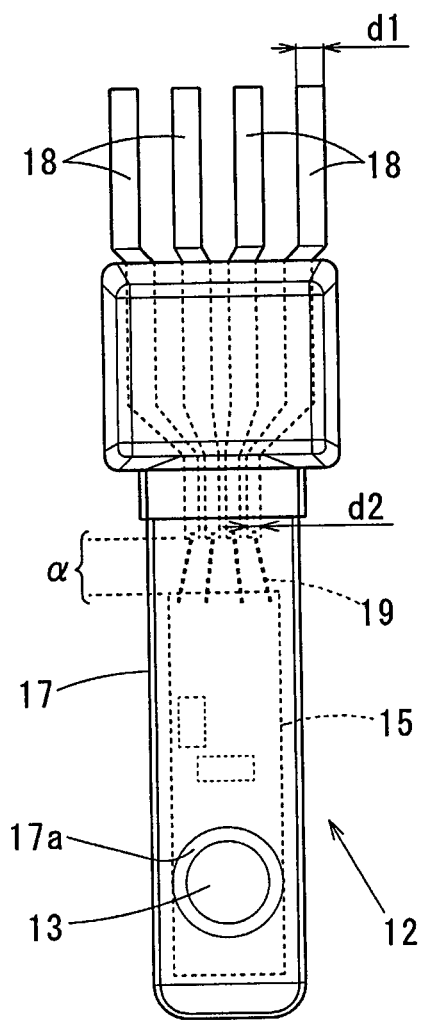
FIG. 7 is a diagram of the humidity terminal of the humidity sensor.

Each of the humidity terminals 18 has a shape tapered toward the circuit substrate 15 as shown in FIG. 7.

In FIG. 7, the width of the furthest portion of each of the humidity terminals 18 away from the circuit substrate 15 is represented as d1 whereas the width of the closest portion of each of the humidity terminals 18 to the circuit substrate 15 is represented as d2. Then, the width d1 and the width d2 can be represented as d1>d2.

The thickness of the furthest portion and the thickness of the closest portion are the same. Thus, the cross-section of each of the humidity terminals 18 at a position close to the circuit substrate 15 is smaller than the cross-section of each of the humidity terminals 18 at a position away from the circuit substrate 15. As a result, thermal resistance of each of the humidity terminals 18 at a position close to the circuit substrate 15 is greater than thermal resistance of each of the humidity terminals 18 at a position away from the circuit substrate 15.

In this way, since each of the humidity terminals 18 has a shape tapered toward the circuit substrate 15, the thermal conductivity of the humidity terminals 18 gradually increases according to the positions of the humidity terminals 18 toward the electric connectors 19. Therefore, heat transfer toward the electric connectors 19 through the humidity terminals 18 can be reduced, and as a result an amount of heat reaching the humidity sensing element 13 can be decreased.

In the first embodiment, the suppressing portion α is positioned, in a state where the intake air flow rate measuring device 100 is attached to the intake air duct D, such that the suppressing portion α is exposed to the intake air flowing through the intake air duct D. Specifically, when viewed from an upstream side of the intake air duct D, the suppressing portion α is positioned inside the intake air duct D.

Therefore, the suppressing portion α can be forcibly cooled by the intake air flowing through the intake air duct D. Thus, heat from the outside of the intake air duct D can be suppressed to transfer to the humidity sensing element 13 through the suppressing portion α.

Modification to First Embodiment

In the above-described embodiment, to reduce intake air resistance, the humidity sensor 12 is arranged such that the elongated surface of the humidity sensor 12 along the z1 direction is parallel with the flow direction of the intake air. Alternatively, the elongated surface of the humidity sensor 12 along the z1 direction may be angled with the flow direction of the intake air. Accordingly, the suppressing portion α can more actively receive the intake air, and thus the effect of cooling the suppressing portion α can be enhanced.

As another embodiment, a plurality of recessed portions may be formed on a surface of the suppressing portion α to increase a heat exchange efficiency between the suppressing portion α and the intake air. Accordingly, cooling effects on the suppressing portion α can be increased, and as a result the heat transfer suppressing effect by the suppressing portion α can be improved.

Second Embodiment

Next, the second embodiment will be described with reference to FIG. 8.

In the second embodiment, a recessed portion γ are formed in the molding resin 17 to further decrease the suppressing portion cross-section α1.

Figure 8:
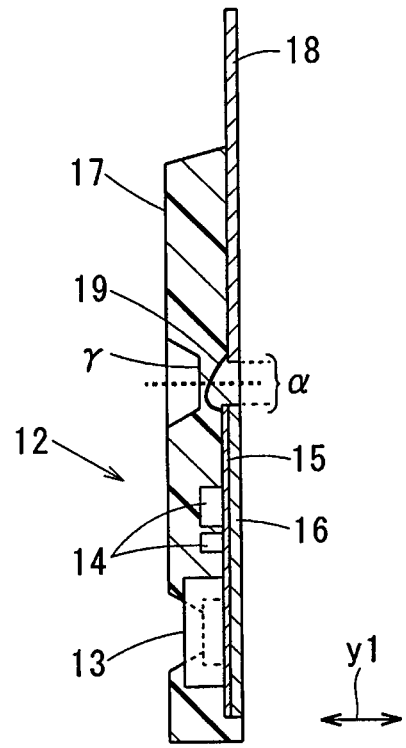
FIG. 8 is a cross-sectional view of the humidity sensor taken along the elongated direction.

The recessed portion γ makes the thickness of the suppressing portion α along the y1 direction thinner than the thickness of other portions of the molding resin 17 along the y1 direction, as shown in FIG. 8.

Accordingly, the suppressing portion cross-section α1 can be made much smaller, and therefore thermal resistance of the suppressing portion α can be further increased. Furthermore, it is possible to further decrease heat capacity of the suppressing portion α, and thus the suppressing portion α can be easily cooled. As a result, the heat transfer suppressing effect by the suppressing portion α can be improved.

Third Embodiment

Next, the third embodiment will be described with reference to FIG. 9.

In the third embodiment, two recessed portions γ are formed in the molding resin 17 to further decrease the suppressing portion cross-section α1, as with the second embodiment.

Figure 9:
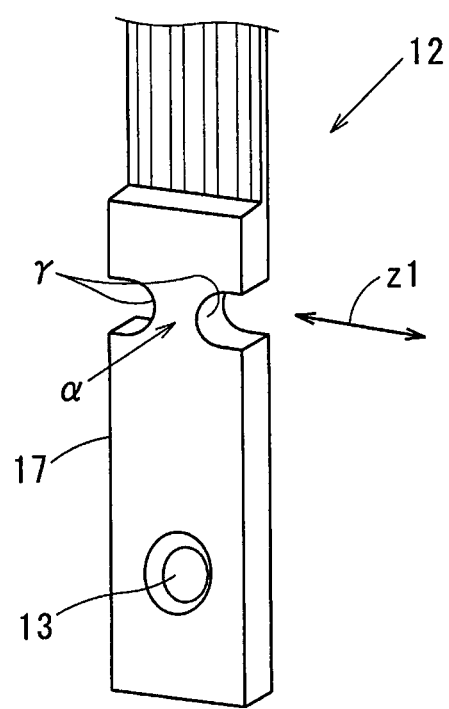
FIG. 9 is an external view of the humidity sensor.

The two recessed portions γ make the thickness of the suppressing portion α along the z1 direction thinner than the thickness of other portions of the molding resin 17 along the z1 direction, as shown in FIG. 9.

Accordingly, the same advantages as the second embodiment can be obtained.

Fourth Embodiment

Figure 10:
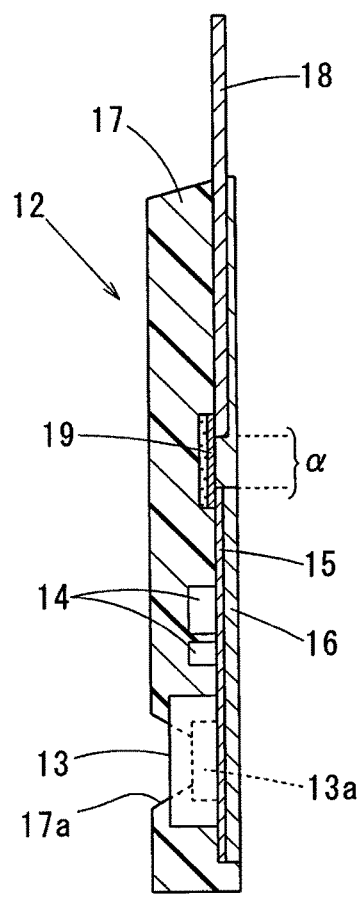
FIG. 10 is a cross-sectional view of the humidity sensor taken along the elongated direction.

Next, the fourth embodiment will be described with reference to FIG. 10.

In the fourth embodiment, a ceramic substrate is used as the electric connector 19. The ceramic substrate is made by printing a conductive metallic pattern on a surface of a ceramic having thermal conductivity lower than the molding resin 17. The metallic pattern may be formed of a copper or silver.

By using the ceramic substrate as the electric connector 19, thermal resistance of the electric connector 19 can be increased. Therefore, the heat transfer suppressing effect by the suppressing portion α can be improved. Further, by using the ceramic substrate, productivity during electric connection between the humidity terminals 18 and the circuit substrate 15 can be increased. Furthermore, strength of the suppressing portion α can be improved by using the ceramic substrate.

That is, the heat transfer suppressing effect by the electric connector 19, productivity for electric connecting process, and strength of the suppressing portion α can be improved at the same time by using the ceramic substrate as the electric connector 19.

Fifth Embodiment

Figure 11:
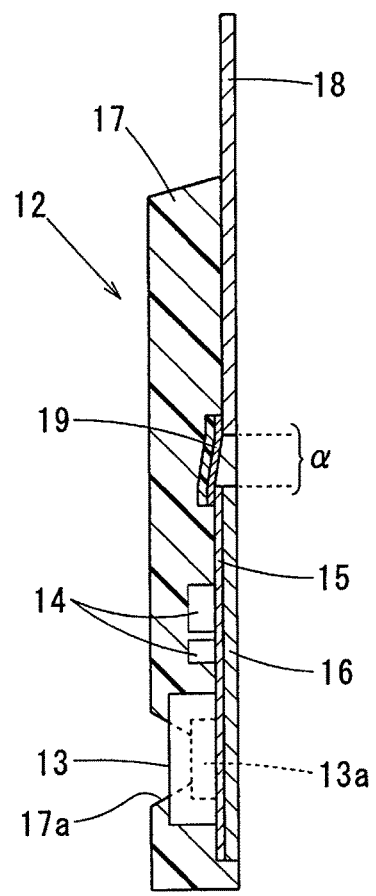
FIG. 11 is a cross-section view of the humidity sensor taken along the elongated direction.

Next, the fifth embodiment will be described with reference to FIG. 11.

In the fifth embodiment, a flexible substrate is used as the electric connector 19. The flexible substrate is made by printing a conductive metallic pattern on a surface of a resin insulating film. The metallic pattern may be formed of a copper or silver.

By using the flexible substrate as the electric connector 19, thermal resistance of the electric connector 19 can be increased. Therefore, the heat transfer suppressing effect by the electric connector 19 can be improved. Further, by using the flexible substrate, productivity during electric connection between the humidity terminals 18 and the circuit substrate 15 can be increased.

That is, the heat transfer suppressing effect by the electric connector 19 and productivity for electric connecting process can be improved at the same time by using the flexible substrate as the electric connector 19.

Sixth Embodiment

Next, the sixth embodiment will be described with reference to FIG. 12.

In the sixth embodiment, an opening δ is formed in the molding resin 17 such that the electric connectors 19 are directly exposed to the intake air flowing through the intake air duct D.

Figure 12:
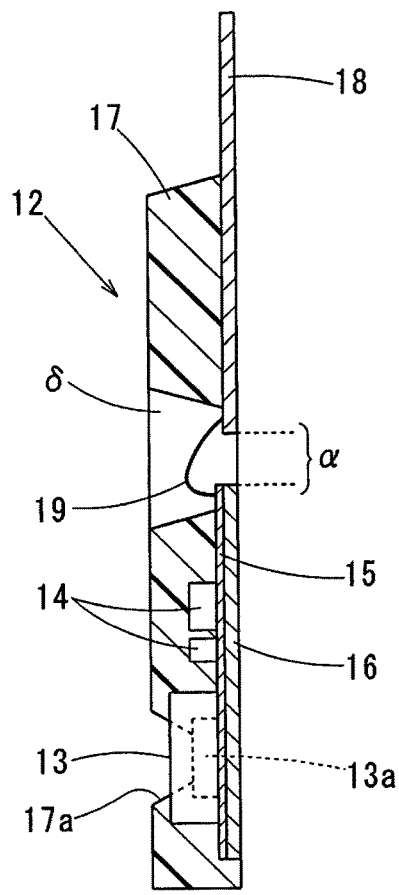
FIG. 12 is a diagram of the suppressing portion.

FIG. 12 shows the opening δ that passes through the molding resin 17 in the thickness direction thereof. Alternatively, the opening δ may be recessed from the molding resin 17 such that the electrical connectors 19 are directly exposed to the intake air.

By providing the opening δ, the electric connectors 19 can be directly cooled by the intake air. Thus, the heat transfer suppressing effect by the electric connectors 19 can be improved.

It should be noted that the opening δ may be applied to the seventh embodiment as described below.

Seventh Embodiment

Figure 13:
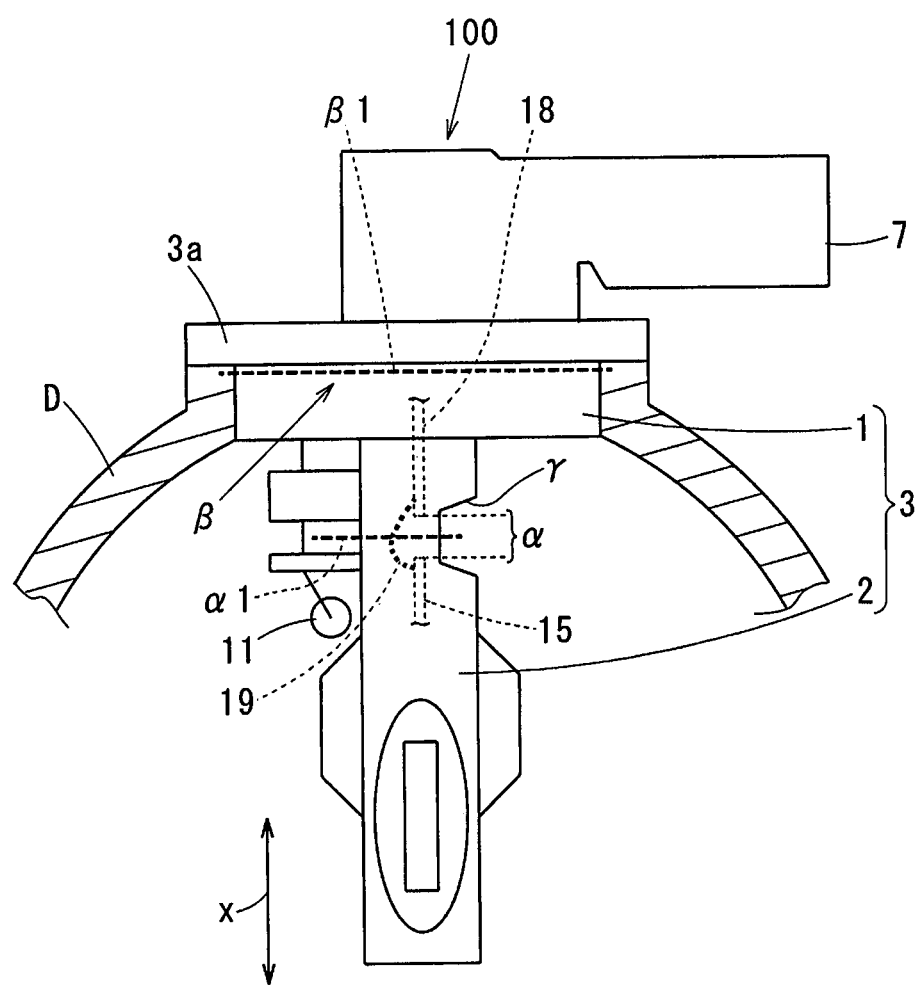
FIG. 13 is a front view of the intake air flow rate measuring device viewed from an upstream side of the airflow direction of the intake air.

Next, the seventh embodiment will be described with reference to FIG. 13.

In the seventh embodiment (and the eighth embodiment described later), the humidity sensing element 13 and the suppressing portion α are disposed in the main body 2.

The casing 3 includes the main body 2 having both the flow rate sensor 8 and the humidity sensing element 13. Then, a portion of the main body 2 in the casing 3 serves as the suppressing portion α.

More specifically, in the seventh embodiment, the circuit substrate 15 is disposed inside the main body 2. The humidity sensing element 13 is positioned to be exposed to the intake air inside the bypass passage 5 or the sub-bypass passage 6 to detect a humidity of the intake air. It should be noted that the location of the humidity sensing element 13 is not necessarily limited to the above. For example, the humidity sensing element 13 may be positioned outside the main body 2 to detect a humidity of the intake air flowing through an outside are of the main body 2.

As with the first embodiment, the humidity terminals 18 and the circuit substrate 15 are spaced away along the x-axis direction from each other. The humidity terminals 18 and the circuit substrate 15 are electrically connected to each other through the electric connectors 19.

Although the circuit substrate 15 is disposed inside the main body 2, the humidity terminals 18 and the circuit substrate 15 are spaced away from each other, as described above. Then, the portion of the main body where the humidity terminals 18 and the circuit substrate 15 are spaced away from each other serves as the suppressing portion α.

In the seventh embodiment, the suppressing portion α is formed in the main body 2, the base portion β is formed in the base 1. The main body 2 has a cross-section smaller than the base 1. Thus, the suppressing portion cross-section α1 can be smaller than the base portion cross-section 131.

Even when the humidity sensing element 13 is disposed in the main body 2 as described above, heat transfer from an outside of the intake air duct D to the humidity sensing element 13 can be suppressed by the suppressing portion cross-section α1 that is smaller than the base portion cross-section 131.

Furthermore, in the seventh embodiment, the recessed portion γ is formed at the suppressing portion α to further narrow the suppressing portion cross-section α1. Accordingly, thermal resistance of the suppressing portion α can be increased, thereby suppressing heat from an outside of the intake air duct D to transfer to the humidity sensing element 13. Instead of the recessed portion γ, the suppressing portion cross-section α1 may be narrowed by forming a space inside the suppressing portion α (see the housing space 40 in the eighth embodiment described later).

In addition to the above-described structures, a measuring space (see the humidity sensing space 21b in the eighth embodiment described later) through which the intake air flows may be formed in the center region of the intake air duct D. The humidity sensing element 13 may be arranged inside the measuring space. According to this arrangement, the humidity sensing element 13 is spaced away from the wall of the intake air duct D as much as possible, and is surrounded by the main body 2. Thus, it is possible to prevent radiant heat released from the wall of the intake air duct D as far-infrared radiation from reaching the humidity sensing element 13.

As a result, heat transfer from the outside can be suppressed by the suppressing portion α, and therefore an increase in the temperature of the humidity sensing element 13 can be suppressed. Furthermore, the radiant heat from the wall can be blocked by the member surrounding the humidity sensing element 13, thereby suppressing an increase in the temperature of the humidity sensing element 13.

Eighth Embodiment

Next, the eighth embodiment will be described with reference to FIGS. 14 to 17.

The flow rate sensor 4 is formed as a sensor module integrally having the flow rate detector 8a and the humidity sensing element 13. That is, the casing 3 includes the main body 2 integrally having the flow rate sensor 8 and the humidity sensing element 13, as with the seventh embodiment. Then, a portion of the main body 2 in the casing 3 serves as the suppressing portion α.

A plurality of sensor terminals 20 are disposed in the flow rate sensor 4 to output/input a signal to/from the flow rate sensor circuit 9. The sensor terminals 20 are electrically connected to the flow rate terminals 10 and the humidity terminals 18 through the electric connectors 19.

The sensor terminals 20 electrically connected to the humidity sensing element 13 correspond to the element terminals.

The flow rate detector 8a and the humidity sensing element 13 are electrically connected to the flow rate sensor circuit 9 through wiring (not shown) such as a metal wiring. The flow rate sensor circuit 9 is disposed between the flow rate detector 8a and the humidity sensing element 13. It should be noted that the positions of the humidity sensing element 13 and the flow rate sensor circuit 9 may be reversed so that the flow rate sensor circuit 9 is positioned between the sensor terminals 20 and the humidity sensing element 13.

The flow rate detector 8a measures a flow rate of the intake air through heat transfer from the intake air flowing through the sub-bypass passage 6. More specifically, the flow rate detector 8a includes, as a temperature sensing element, a diaphragm on a flat substrate made of a high thermal conductive material such as a silicon or a ceramic. A heat element to heat the intake air is disposed in the diaphragm, and a thermosensitive resistor to detect a temperature of the intake air heated by the heat element is also disposed in the diaphragm. The flow rate sensor circuit 9 controls the heat element by applying an electric current to the heat element and then measures a flow rate of the intake air based on an amount of heat of the intake air heated by the heat element. That is, the flow rate sensor circuit 9 processes a signal that is output from the flow rate detector based on the amount of heat.

The humidity sensing element 13 has a similar structure to the first embodiment. That is, the humidity sensing element 13 is a device utilizing a capacitance change.

The flow sensor circuit 9 is electrically connected to the sensor terminal 20. The flow rate sensor circuit 9 outputs the flow rate to an external component outside of the intake air flow rate device 100 through the sensor terminal 20.

The flow rate detector 8a, the humidity sensing element 13, and the flow rate sensor circuit 9 are integrally disposed inside a polymeric resin such as a thermosetting resin to form the flow rate sensor 4.

Figure 16:
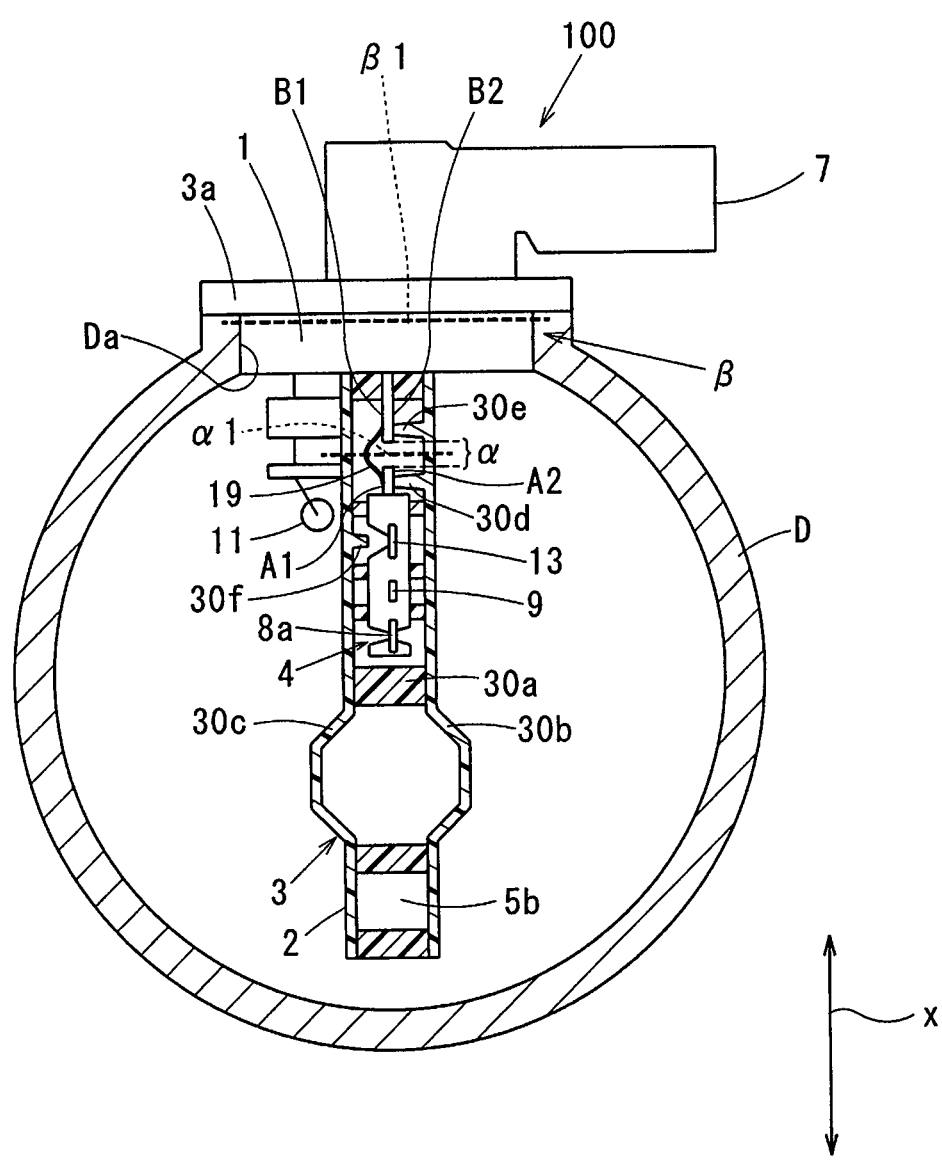
FIG. 16 is a cross-sectional view taken along XVI-XVI line in FIG. 15.
Figure 17:
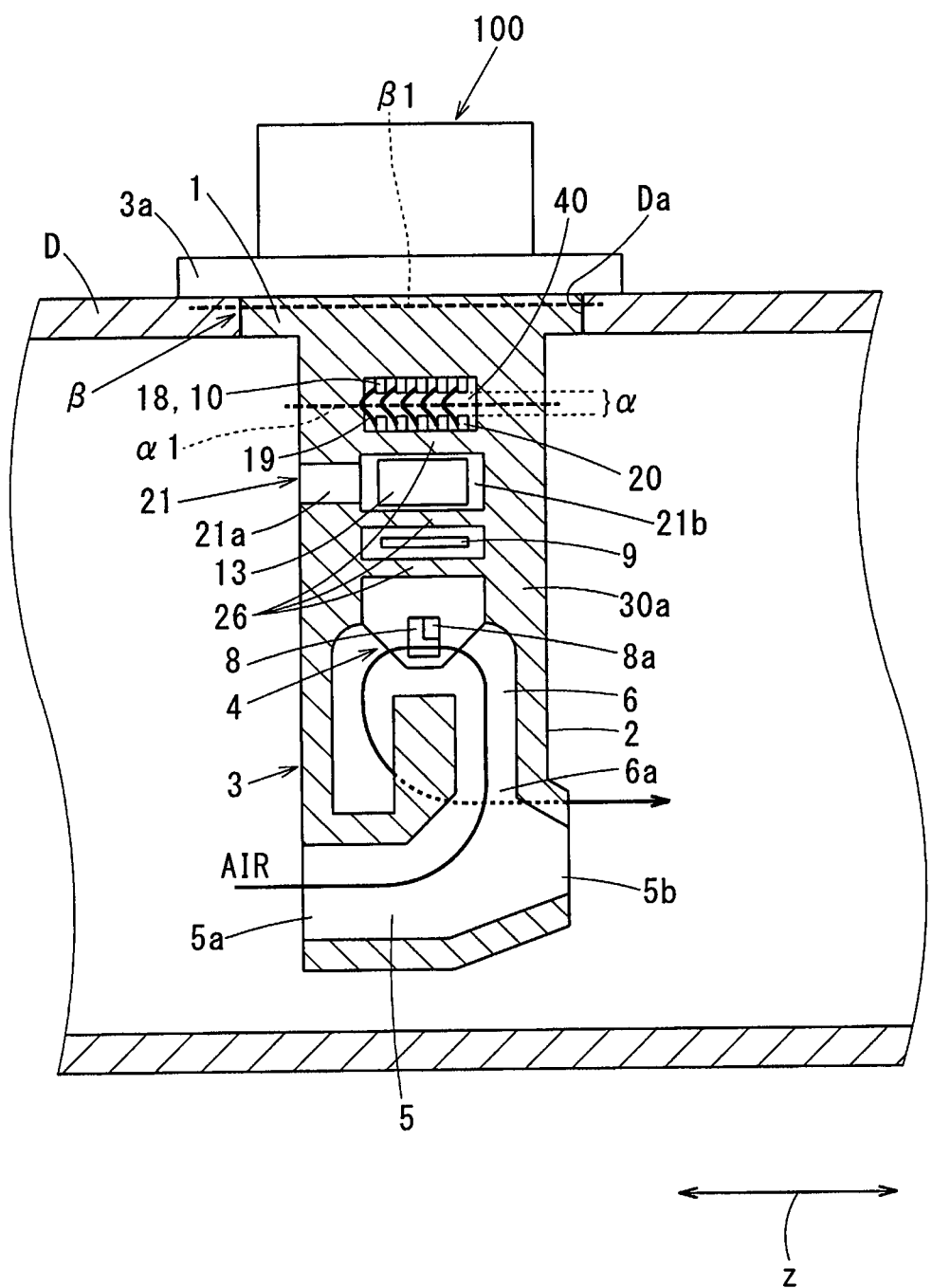
FIG. 17 is a diagram of the intake air flow rate measuring device without a right cover.

Referring to FIG. 16, the main body 2 of the eighth embodiment will be described below. The main body 2 includes a case 30a housing the flow rate sensor 4. The main body 2 includes a right cover 30b attached to the right surface of the main body 2 and a left cover 30c attached to the left surface of the main body 2.

In the eighth embodiment, the flow rate sensor 4 is fixed inside the main body 2 by attaching the right cover 30b and the left cover 30c to the both side surfaces of the case 30a.

Figure 15:
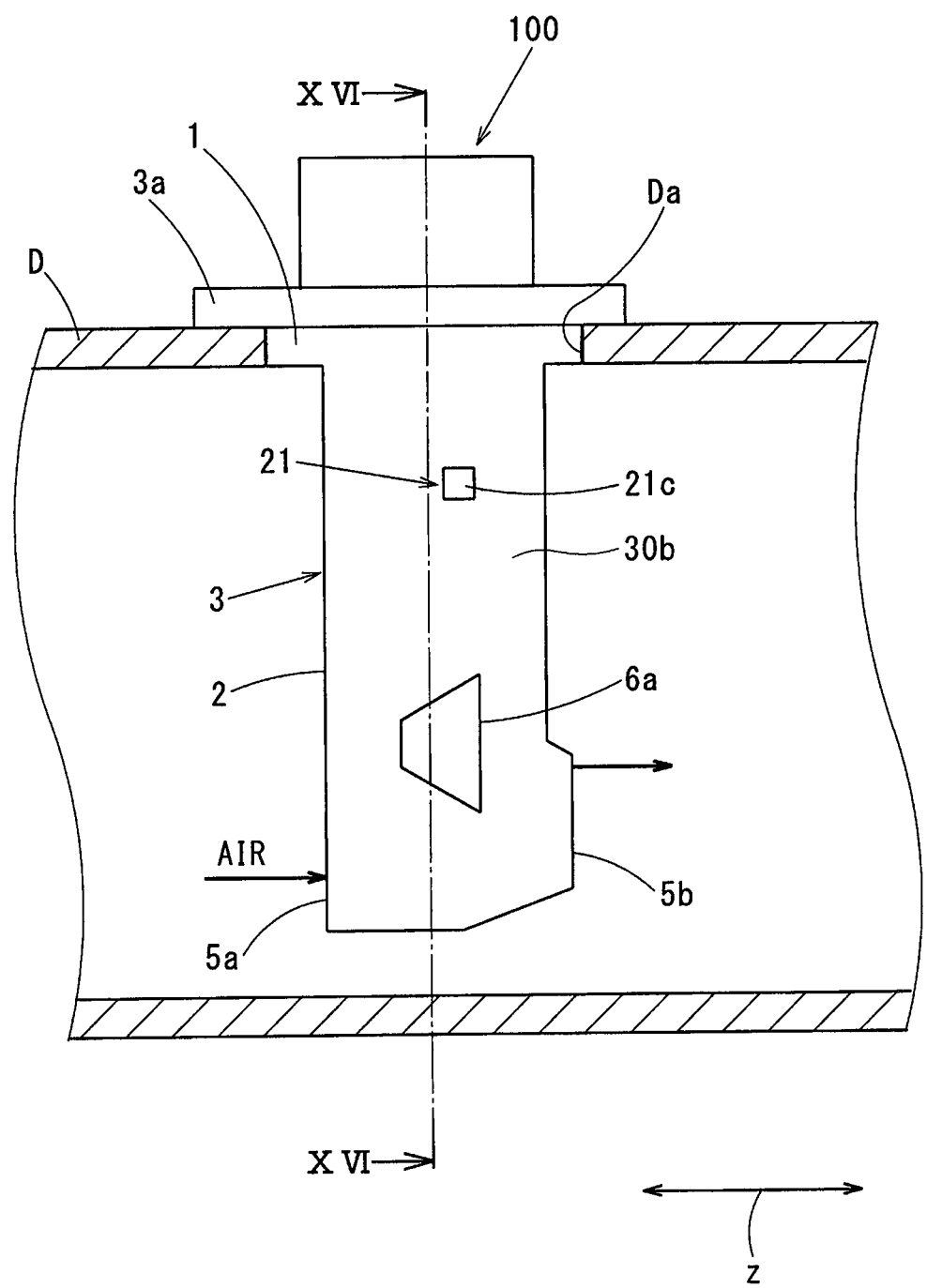
FIG. 15 is a side view of the intake air flow rate measuring device.

A humidity measuring passage 21 is defined in the main body 2 in addition to the sub-bypass passage 6. A second intake air inlet 21a to draw the intake air in is formed in the humidity measuring passage 21 at an upstream side of the case 30a. The second intake air inlet 21a is in fluid communication with a humidity sensing space 21a formed in the case 30a. A portion of the case 30a remains at a position downstream of the humidity sensing space 21b. The humidity sensing element 13 exists in the humidity sensing space 21b. A second sub-outlet 21c in fluid communication with the humidity sensing space 21b is open at the right cover 30b as shown in FIG. 15.

Accordingly, a portion of the intake air flowing through the intake air duct D is taken in through the second intake air inlet 21a. Then, the portion of the intake air flows through the humidity sensing space 21b and returns into the intake air duct D through the second sub-outlet 21c. The humidity sensing element 13 detects a humidity of the intake air flowing through the humidity sensing space 21b.

In the bypass passage 5, the intake air inlet 5a is formed in a front surface of the case 30a facing the upstream side of the intake air duct D, and the intake air outlet 5b is formed in a back surface of the case 30a facing the downstream side of the intake air duct D. A portion of the intake air taken in through the intake air inlet 5a returns into the intake air duct D through the intake air outlet 5b, and the remaining portion flows into the sub-bypass passage 6. The intake air in the sub-bypass passage 6 passes through the flow rate detector 8a in the sub-bypass passage 6, and then returns into the intake air duct D through the sub outlets 6b formed in the right cover 30b and the left cover 30c.

The humidity sensing space 21b is formed by recessing the case 30a. The humidity measuring passage 21 is defined by covering the side surfaces of the case 30a with the right cover 30b and the left cover 30c.

Figure 14:
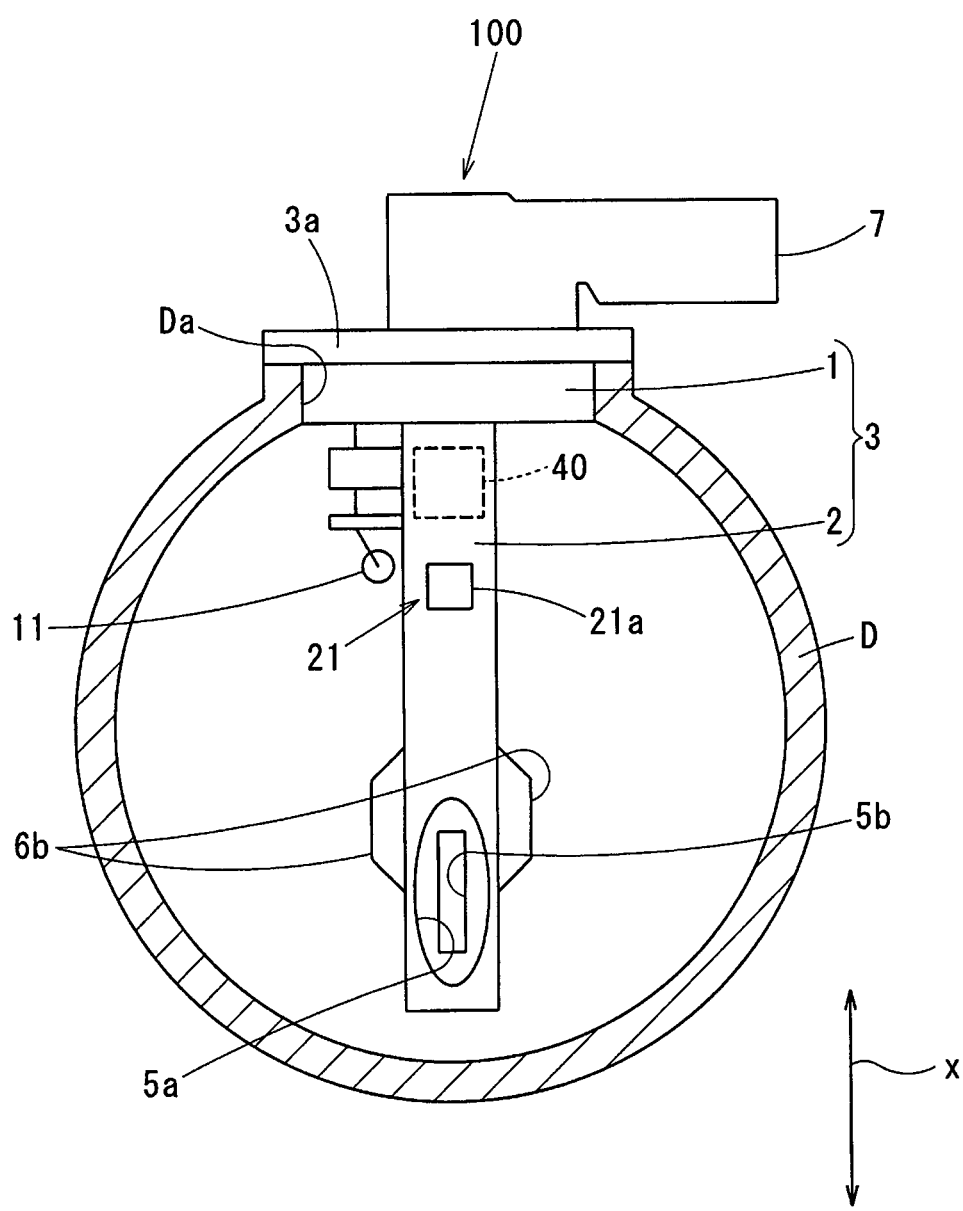
FIG. 14 is a front view of the intake air flow rate measuring device viewed from an upstream side of the airflow direction of the intake air.

As shown in FIG. 14, the second intake air inlet 21a is formed on the front surface of the case 30a.

In the eighth embodiment, the second sub-outlet 21c is formed in the right cover 30b as shown in FIG. 15.

The flow rate sensor circuit 9 is a large scale integrated circuit (i.e., LSI). Such an LSI has increased its integration in recent years. The flow rate sensor circuit 9 is also electrically connected to plural detectors (such as the flow rate detector 8a and the humidity sensing element 13). Therefore, the flow rate sensor circuit 9 easily generates heat. Since the flow rate detector 8a is affected by heat from other than the intake air (e.g., the flow rate sensor circuit 9), accuracy of measuring the flow rate would be deteriorated due to heat other than the intake air.

Then, in the eighth embodiment, the flow rate sensor circuit 9 is indirectly cooled by allowing a portion of the intake air to flow through the humidity sensing space 21. That is, heat of the flow rate sensor circuit 9 is less likely effect the flow rate detector 8a.

As described above, the sensor terminals 20 are connected to the humidity terminals 18 and the flow rate terminals 10 via the electric connectors 19. Each of the sensor terminals 20 protrudes from one end surface of the flow rate sensor 4 opposite to the side in which the flow rate detector 8a is disposed. The humidity terminals 18 and the flow rate terminals 10 protrude toward the sensor terminal 20.

An end of each of the sensor terminals 20, an end of each of the humidity terminals 18, an end of each of the flow rate terminals 10, and the electric connector 19 are positioned inside a housing space 40 defined in the case 30a.

The housing space 40 is a space inside the main body 2 and is separated from the intake air flowing through the intake air duct D.

Specifically, the housing space 40 passes through the case 30a in a direction along which the right cover 30b and the left cover 30c are arranged. The housing space 40 is separated from an outside when the right cover 30b and the left cover 30c are attached to the case 30a.

As with the seventh embodiment, the suppressing portion α is disposed in the main body 2, and the base portion β is disposed in the base 1. The cross-section of the main body 2 is smaller than the base 1, and therefore the suppressing portion cross-section α1 can be smaller than the base portion cross-section β1.

As a result, even the humidity sensing element 13 is disposed in the main body 2, heat from an outside of the intake air duct D is less likely to transfer to the humidity sensing element 13.

Figure 18A:
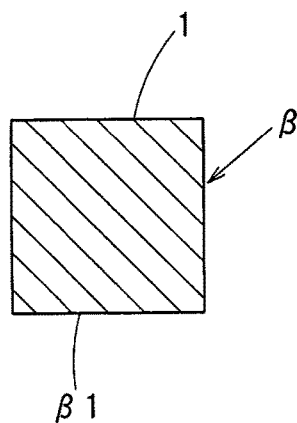
FIG. 18A is a diagram of the root portion cross-section.
Figure 18B:
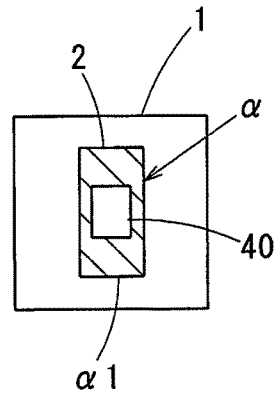
FIG. 18B is a diagram of the suppressing portion cross-section.
Figure 19:
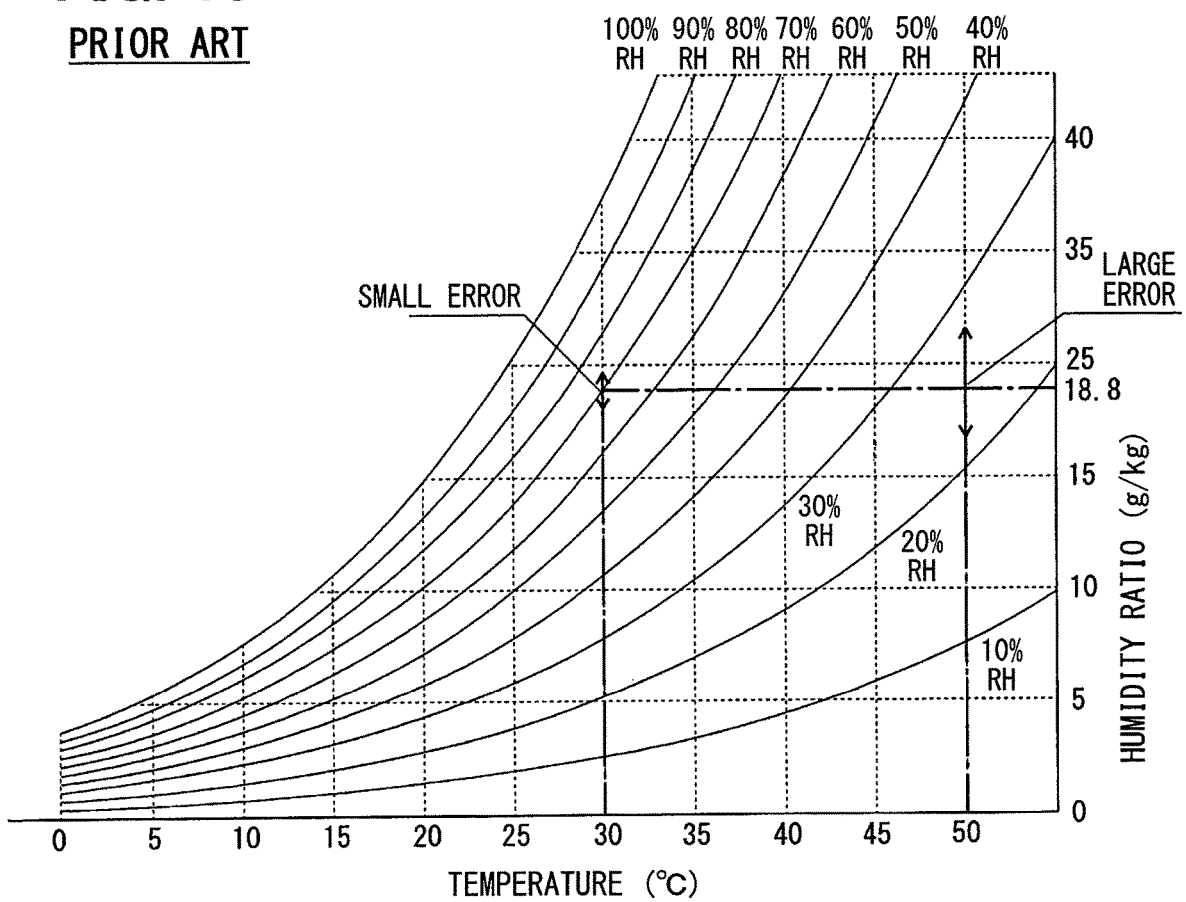
FIG. 19 is graphs showing a relationship between a relative humidity, a humidity, and a humidity ratio (prior art)

In the eighth embodiment, the housing space 40 is formed in the suppressing portion α to further reduce the suppressing portion cross-section α1. FIG. 18B shows a cross-section of the suppressing portion α in the main body 2. It should be noted that the cross-section of the base portion β is the cross-section of the base 1, as with the first embodiment (see FIG. 18A).

In this way, the suppressing portion cross-section α1 is further made small by forming the housing space 40 in the suppressing portion α. As a result, thermal resistance of the suppressing portion α can be increased. Thus, heat from an outside of the intake air duct D is less likely to transfer to the humidity sensing element 13.

In the case 30a, separations 26 to separate the flow rate detector 8a from the humidity sensing element 13 are provided. The flow rate sensor 4 is fixed to the case 30a by the separators 26.

Portions of the separators 26 are involved to define the sub-bypass passage 6, the humidity measuring passage 21, and the housing space 40. In this way, these passages and the housing space 40 are defined by the separators 26. Thus, the structure of the intake air flow rate measuring device 100 can be simple.

The position of the inlet to take in the intake air and the number of the inlet are not necessarily limited to the above as long as the intake air flowing through the intake air duct D can be taken in through the inlet to flow toward the bypass passage 5 and the humidity measuring passage 21. In the eighth embodiment, the intake air inlet 5a and the second intake air inlet 21a are formed in the front surface of the intake air flow rate measuring device 100 that faces the upstream side of the intake air duct D. Accordingly, the intake air flowing through the intake air duct D can be smoothly directed to the bypass passage 5 and the humidity measuring passage 21.

In the eighth embodiment, the housing space 40 and the humidity measuring passage 21 are formed between the flow rate detector 8a and the flange 3a. Thus, heat transfer from the intake air duct D to the flow rate detector 8a through the case 30a can be suppressed.

Further, the position and the number of the outlet to discharge the intake air in the humidity measuring passage 21, i.e., the second sub-outlet 21c of the humidity measuring passage 21, are not necessarily limited to the above as long as a portion of the intake air flowing through the intake air duct D can be guided to the humidity measuring passage 21 and returned into the intake air duct D again. In the eighth embodiment, the second intake air inlet 21a is positioned upstream of the second sub-outlet 21c, and thus it is possible to suppress the intake air to stay in the humidity measuring passage 21.

In the eighth embodiment, the second sub-outlet 21c is formed in the right cover 30b. Thus, strength of the case 30 can be obtained. Further, the humidity sensing element 13 is not less likely to be affected by a reverse flow of the intake air in the intake air duct D.

It should be noted that the second sub-outlet 21c may be formed in the left cover 30c, or each of the left cover 30c and the right cover 30b may have the second sub-outlet 21c.

As shown in FIGS. 14 and 15, the opening area of the second sub-outlet 21c is smaller than the second intake air inlet 21a. Alternatively, the opening area of the second sub-outlet 21c may be larger than the second intake air inlet 21a. Further, the opening area of the second sub-outlet 21c may be the same as the second intake air inlet 21a.

In the eighth embodiment, the housing space 40 is a space containing air. However, the housing space 40 may be vacuum or filled with a filler such as gel or epoxy resin.

In the following description, one surface of each of the sensor terminals 20 on which the sensor terminal 20 is in contact with the electric connector 19 is defined as a surface A1, and the other surface of the sensor terminal 20 opposite to the surface A1 is defined as a surface A2 (see FIG. 16).

One surface on which the flow rate terminal 10 and the humidity terminal 18 are in contact with the electric connector 19 is defined as a surface B1, and the other surface opposite to the surface B1 is defined as a surface B2.

As shown in FIG. 16, the right cover 30b includes a first protrusion 30d protruding toward the surface A2 of the sensor terminal 20. The first protrusion 30d supports the surface A2 of the sensor terminal 20.

Similarly, the right cover 30b includes a second protrusion 30e protruding toward the flow rate terminal 10 and the humidity terminal 18. The surface B2 of the flow rate terminal 10 and the humidity terminal 18 are supported by the second protrusion 30e.

In this way, due to the existence of the protrusions to support the terminal, wire bonding process to connect each terminal to the electric connector 19 can be stably performed. In this case, the wire boding is performed in a state where the right cover 30b is fixed to the case 30a whereas the left cover 30c is not connected to the case 30a. Alternatively, the first protrusion 30d and the second protrusion 30e may be disposed in the left cover 30c, and then the wire bonding may be performed in a state where the left cover 30c is fixed to the case 30a whereas the right cover 30b is not fixed to the case 30a.

A squeezed portion 30f protruding toward the humidity sensing element 13 may be formed in either the right cover 30b or the left cover 30c to narrow a space of the humidity measuring passage 21.

Furthermore, the intake air temperature sensor 11 may be arranged in the second intake air inlet 21a. Alternatively, the intake air temperature sensor 11 may be arranged between the second intake air inlet 21a and the intake air duct D. Furthermore, the humidity sensing space 21b may be formed at a position downstream of the intake air temperature sensor 11.

The humidity terminals 18 and the flow rate terminals 10 may be disposed inside the connector 7. Alternatively, to downsize the connector 7, the humidity detection value and the flow rate detection value may be output through a single terminal to an outside of the intake air flow rate measuring device 100.

What is claimed is:

1. An intake air flow rate measuring device that is inserted into an attachment hole of an intake air duct introducing an intake air into an engine, the intake air flow rate measuring device measuring a flow rate of the intake air flowing through the intake air duct, the intake air flow rate measuring device comprising:
   a flange that is disposed outside of the intake air duct to cover the attachment hole;
   a casing that extends in both the attachment hole and the intake air duct;
   a flow rate sensor that is disposed in the casing to measure a flow rate of the intake air flowing through the intake air duct;
   a humidity sensing element that is disposed in the casing to measure a humidity of the intake air flowing through the intake air duct;
   a circuit that is electrically connected to the flow rate sensor and the humidity sensing element;
   an element terminal that is positioned only inside the intake air duct and is electrically connected to the humidity sensing element; and
   a humidity terminal that passes through the flange, wherein
   the humidity terminal is positioned spaced away from the element terminal,
   an electric connector is disposed between the humidity terminal and the element terminal to electrically connect the humidity terminal to the element terminal,
   heat is less likely to transfer through the electric connector as compared to the humidity terminal and the element terminal,
   a portion of the casing between the element terminal and the humidity terminal is defined as a suppressing portion, and a cross-section of the suppressing portion is defined as a suppressing portion cross-section, and
   an end portion of the casing close to the flange is defined as a base portion, and a cross-section of the base portion is defined as a base portion cross-section, wherein
   the suppressing portion cross-section is set to be smaller than the base portion cross-section, wherein
   the casing includes a main body housing both the flow rate sensor and the humidity sensing element,
   the suppressing portion is a portion of the main body of the casing, and
   the circuit is positioned between the flow rate sensor and the humidity sensing element.

2. The intake air flow rate measuring device according to claim 1, wherein
   the casing includes a main body housing the flow rate sensor, and a humidity sensor including the humidity sensing element,
   the main body and the humidity sensor are separately supported by the flange,
   the humidity sensor includes a circuit substrate, as the element terminal, on which the humidity sensing element is disposed, and a molding resin that covers the humidity sensing element and the circuit substrate, and
   the suppressing portion is a portion of the molding resin between the circuit substrate and the humidity terminal.

3. The intake air flow rate measuring device according to claim 1, wherein
the electric connector has thermal resistance greater than that of the humidity terminal.

4. The intake air flow rate measuring device according to claim 3, wherein
the electric connector is formed of an electrically conductive wiring subject to wire bonding.

5. The intake air flow rate measuring device according to claim 3, wherein
the electric connector is a ceramic substrate on which a conductive metallic pattern is printed.

6. The intake air flow rate measuring device according to claim 3, wherein
the electric connector is a flexible substrate on which a conductive metallic pattern is printed.

7. The intake air flow rate measuring device according to claim 1, wherein
the casing includes a flow rate terminal that is disposed, separately with the humidity terminal, inside the casing and is electrically connected to the flow sensor, and
the humidity terminal has thermal conductivity less than that of the flow rate terminal.

8. The intake air flow rate measuring device according to claim 1, wherein
the humidity terminal has a shape that is tapered toward the element terminal.

9. The intake air flow rate measuring device according to claim 1, wherein
the suppressing portion is located to be directly exposed to the intake air flowing through the intake air duct.

10. The intake air flow rate measuring device according to claim 1, wherein
the electric connector is disposed in a housing space defined in the casing.

11. The intake air flow rate measuring device according to claim 1, wherein
the intake air duct extends along a center axis, and
the flow rate sensor, the circuit, the humidity sensing element, and the suppressing portion are arranged in this order along a radial direction of the intake air duct from the center axis toward the attachment hole.

* * * * *